United States Patent [19]

Spurling

[11] 4,133,032
[45] Jan. 2, 1979

[54] CRANE LOAD INDICATING ARRANGEMENT

[75] Inventor: Alan M. Spurling, Benfleet, England

[73] Assignee: Pye Limited, Cambridge, England

[21] Appl. No.: 794,395

[22] Filed: May 6, 1977

[30] Foreign Application Priority Data

May 14, 1976 [GB] United Kingdom ............... 19976/76

[51] Int. Cl.² ........................ G08B 21/00; G06F 15/20
[52] U.S. Cl. ..................................... 364/424; 340/685; 364/567
[58] Field of Search ........................ 364/567, 463, 424; 340/267 C; 177/25, 45, 147

[56] References Cited

U.S. PATENT DOCUMENTS

| | | | |
|---|---|---|---|
| 3,740,534 | 6/1973 | Kezer et al. ........................... | 364/567 |
| 3,819,922 | 6/1974 | Horn et al. ........................... | 364/424 |
| 3,913,690 | 10/1975 | Hutchings et al. ..................... | 177/45 |
| 3,965,733 | 6/1976 | Hutchings et al. ............... | 340/267 C |
| 4,052,602 | 10/1977 | Horn et al. ........................... | 364/424 |

OTHER PUBLICATIONS

Analog Digital Conversion Handbook, Published by Analog Devices, Inc., Massachussetts, 1972, pp. I-62-I--65 of interest.

*Primary Examiner*—Felix D. Gruber
*Attorney, Agent, or Firm*—Thomas A. Briody; David R. Treacy; Bernard Franzblau

[57] ABSTRACT

A crane safe load indicator uses a single low generator unit supplied with operating potentials from a digital storage device via a digital-to-analog converter and sample and hold circuits. The storage device stores information related to the operating characteristics of the crane for each mode of operation thereof thereby eliminating the need for a separate law generator unit for each mode of operation, each of which requires a plurality of potentiometers to provide the proper input-output characteristics.

6 Claims, 8 Drawing Figures

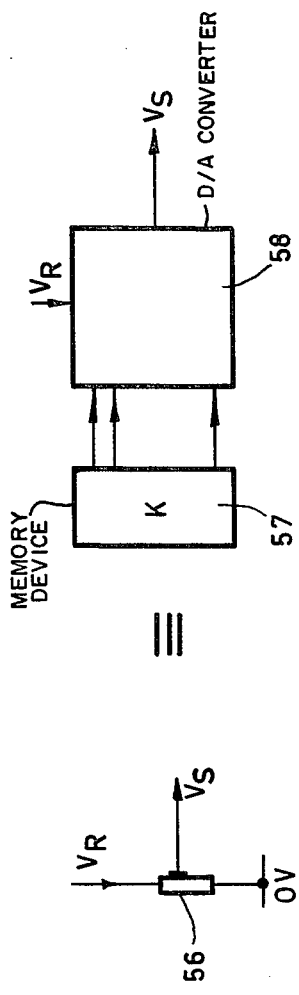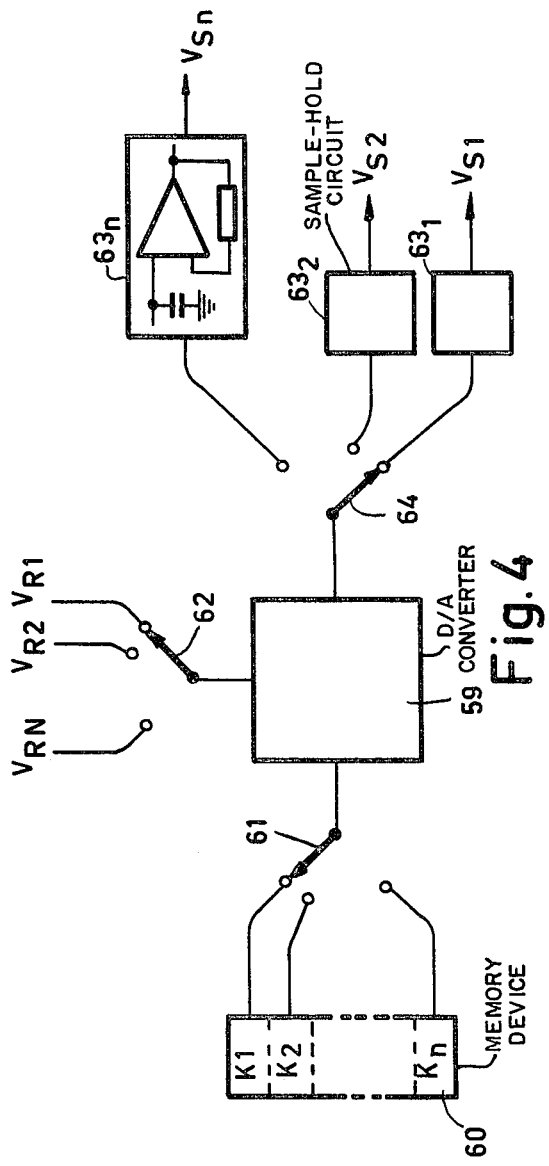

CRANE LOAD INDICATING ARRANGEMENT

This invention relates to a load indicating arrangement for use with cranes, derricks and other lifting apparatus of the kind having a pivoted boom which can be luffed by an hydraulic ram or other boom supporting means. It has a particular but non-exclusive application to mobile cranes of the above kind having an extensible boom which can be slewed through the whole or part of a circle.

A typical mobile crane of the above kind has a boom comprising a plurality of telescoping sections, of which the lowermost is pivoted to a base unit for luffing movement by means of an hydraulic ram. One end of the ram is also pivoted to the base unit, and the other end is pivoted to a point on the lowermost section so as to support the boom at an angle (the luff angle) to the horizontal which is determined by the extension of the ram. The base unit is mounted on a road or rail chassis and is arranged to slew through the whole or part of a circle about a vertical axis. As an alternative to the hydraulic ram, the boom can be supported by a winch cable which is secured to its outer end and which can be wound in and out to luff the boom. For this alternative the boom is not usually telescopic.

The chassis may be provided with outriggers or blocking girders, which are carried in a stowed position when the crane is in road trim, but which can be extended outwards from the chassis and have their outer ends blocked up from the ground in order to increase the crane's stability and to relieve the load on the road wheels.

For basic duties of the crane, a load is supported by a hoist rope or cable passing over a sheave at the outer end of the boom. The crane can lift loads located within a range of radii measured from its slewing centre. For lifting light loads, a fly jib may be secured to the outer end of the boom. This increases the radius of action of the crane.

Such a crane has a number of possible operating configurations (hereinafter referred to as modes of operation), for example, blocked, free on wheels, and with or without fly jib. Whatever mode of operation is used, the load must be limited so that the overturning moment which it produces does not imperil the stability and also that no component part of the crane is over-stressed.

When operating without a fly jib, the prime consideration is stability. Stability is greatest when the outriggers are extended and blocked up. In the free on wheels condition, stability is frequently greater when the boom is extended over an end of the chassis than when it is slewed to one or the other side because the wheel base length of the chassis is usually substantially greater than its track width.

A fly jib is usually of much lighter construction than the main boom to which it is secured, and is adapted to support only relatively light loads. Over much of the radius of operation of the crane, the strength of the fly jib is the limiting factor in determining the maximum safe load, and the question of stability does not arise. At large radii, however, when the main boom is fully extended and at a small luff angle, the moment produced by a load which is within the strength capability of the fly jib may reach the stability limit.

The crane manufacturer prepares rating tables which give the maximum permissible loads which the crane may lift. A separate table is prepared for each possible mode of operation. In general, for modes of operation not involving the fly jib, the safe load is related to radius (i.e. radius from the slewing centre). For modes of operation involving the fly jib, the safe load may be related to luff angle below a given value of radius and to radii above that value, or be related to luff angle for all radii. A typical rating table gives values of maximum safe load corresponding to the maximum and minimum values of radius or luff angle, as the case may be, which the crane can attain in the relevant mode of operation and also load values corresponding to a number of values of radius or luff angle intermediate these limits. For values of radius or luff angle not given in the table, the maximum safe load may be obtained by interpolation. Hereinafter, the term "radius related duties" will be used as a generic term for modes of operation where the safe load is related to radius, and the term "angle related duties" will be used as a generic term for modes of operation where the safe load is related to boom luff angle.

There is known, for use with cranes or other lifting apparatus of the kind referred to, a load indicating arrangement of a type (hereinafter referred to as being of the type specified) which includes law generator means adapted to produce, in respect of each mode of operation of a lifting apparatus for which the arrangement is provided, a reference output which is representative of the maximum safe loading for the lifting apparatus in its prevailing configuration (i.e. the load radius or boom luff angle that currently exists), means for producing a working output which is representative of the actual loading of the lifting apparatus in the prevailing configuration, and means responsive to said reference and working outputs to provide an indication of available lifting capacity of the lifting apparatus.

Different forms of load indicating arrangements of the type specified are described in our U.S. Pat. Nos. 3,965,733 and 3,913,690.

In these different forms of arrangement, the working output is derived in different ways. For instance, as a function of the actual weight of the load, or as a function of the turning moment of the load about the boom pivot point. The reference output, as produced by the law generator means, corresponds to the same type of quantity as the working output so that a comparison can be made between them to give an indication of available lifting capacity. The reference output is produced by a so called mode unit, which comprises a plurality of similar law generator units, one for each mode of operation of the crane, together with means for selecting the unit corresponding to the mode actually in use.

When the crane is performing radius related duties, the selected law generator unit is provided with an input representative of the load radius. For angle related duties, it is provided with an input representative of the boom luff angle.

A law generator unit is arranged to have an input-/output characteristic whose slope is modified stepwise in accordance with changes in the amplitude of its input so as to produce an overall output characteristic comprising a plurality of linear sections of differing slopes. Means are provided for adjusting the input levels at which changes of slope appear and also for controlling the slope of each linear section. The overall characteristic can thus be made to approximate a desired law.

In particular, a five-section characteristic can be set to represent, to a sufficient degree of accuracy, a crane manufacturer's rating curve so that the output of the law generator unit is representative of the maximum safe loading for the particular load radius or luff angle as represented by the value of its input.

It is known practice to construct each law generator unit on a printed circuit board which plugs into a socket provided in the mode unit. The latter can accommodate as many printed circuit boards as there are operational modes for the crane and include selecting switches for selecting any particular printed circuit board. Alternatively, the boards can be manually selected for insertion on a one-at-a-time basis into the mode unit, which can then be much smaller.

It will be appreciated that since the initial output level (i.e. corresponding to zero input), the slopes of the five sections of the characteristic and the break points between the sections are all independently variable, a minimum of ten potentiometers must be provided on each printed circuit board. In addition it is convenient to mount on the board other potentiometers which may be preset to values representative of parameters of the crane which are constant for a particular mode of operation but which may change from one mode to another. Thus, up to sixteen potentiometers may be required on each printed circuit board.

When a load indicating arrangement of the type specified is to be fitted to a crane which has a large number of modes of operation, the space occupied by the mode unit, when the latter has to accommodate a corresponding number of law generator units, becomes inconvenient. Specifically, the total cost of the units becomes very high when there is one for each mode of operation.

It is an object of the present invention to provide a load indicating arrangement of the type specified which includes a cheaper and more convenient law generator means for generating the reference outputs which are required for multi-mode operation.

According to the present invention there is provided a load indicating arrangement for use with a crane or other lifting apparatus which arrangement includes, law generator means adapted to produce, in respect of each mode of operation of a lifting apparatus for which the arrangement is provided, a reference output which is representative of the maximum safe loading for the lifting apparatus in its prevailing configuration, means for producing a working output which is representative of the actual loading of the lifting apparatus in the prevailing configuration, and means responsive to said reference and working outputs to provide an indication of available lifting capacity of the lifting apparatus. This arrangement is characterised in that said law generator means comprises a storage device having a storage location for each mode of operation of the lifting apparatus, each storage location being adapted to store a plurality of items of information pertaining to the operating characteristics of the lifting apparatus in a particular mode of operation, selection means for selecting a particular storage location corresponding to a desired mode of operation for read out, read-out means for reading out and temporarily storing the plurality of items of information from the selected storage location, and means responsive to the temporarily stored items of information for determining the value of said reference output.

In carrying out the invention, the means responsive to the termporarily stored items of information can be a single law generator unit which is common to all modes of operation of the lifting apparatus, but which provides a different input/output characteristic for each mode of operation in accordance with the values of the temporarily stored items of information.

In order that the invention and the manner in which it is to be performed may be more fully understood, an embodiment thereof will now be described, by way of example, with reference to the accompanying drawings, in which:

FIGS. 3a, 3b and 4 are explanatory diagrams illustrating a principle involved in the performance of the invention;

Figure 1:
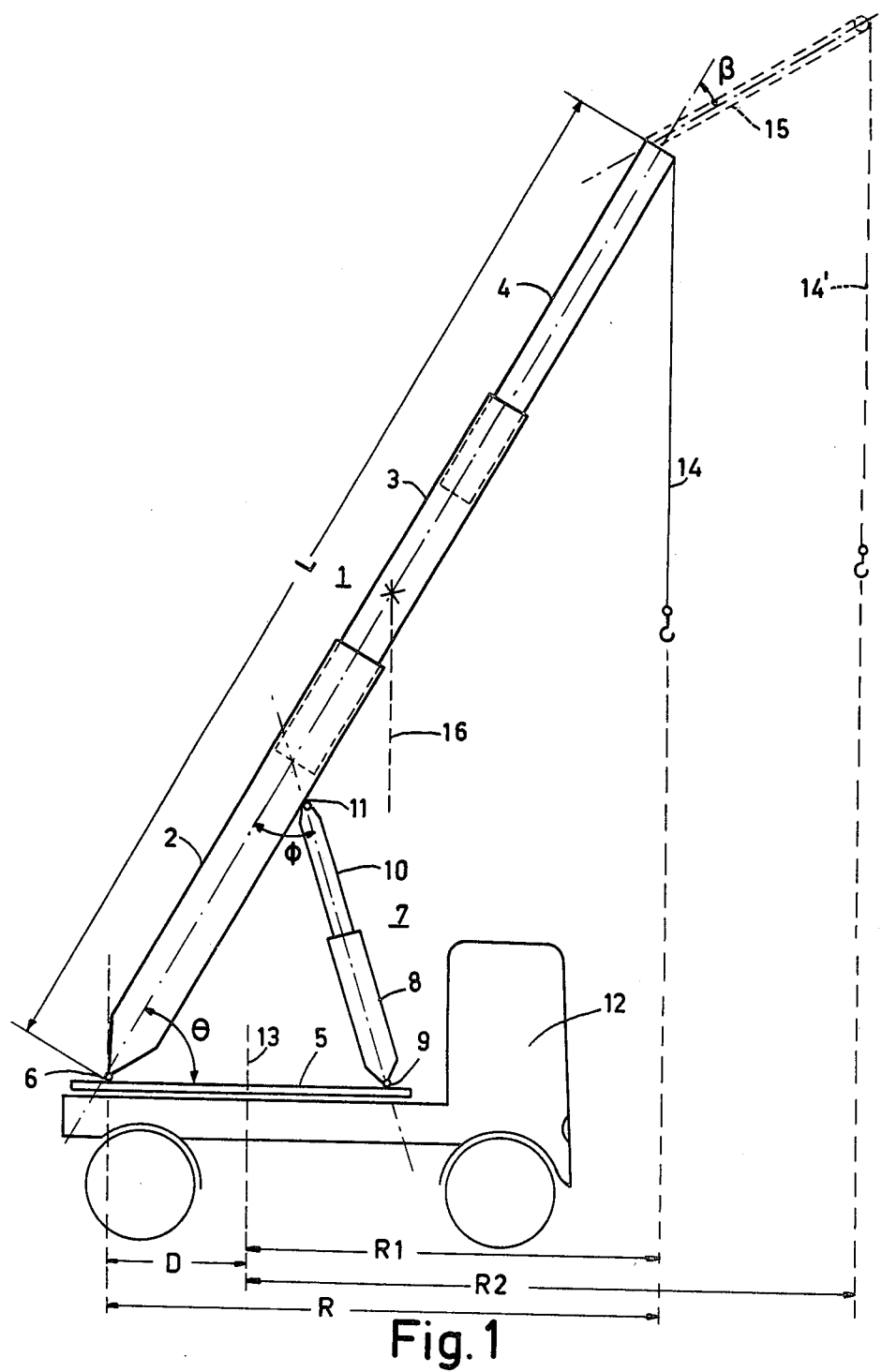
FIG. 1 is a diagrammatic representation of a mobile crane.

Referring first to FIG. 1, the mobile crane there shown has a boom, indicated generally by the reference numeral 1, which comprises a lower section 2, an intermediate section 3 slidable telescopically within the upper end of the section 2, and an upper section 4 slidable telescopically within the upper end of the section 3. Extension means such as an hydraulic ram (not shown in FIG. 1) is provided to position the section 3 with respect to the section 2 and to position the section 4 with respect to the section 3, so that the overall length of the boom 1 may be adjusted to any desired value between a maximum and a minimum limit.

The lower end of the boom section 2 is pivoted to a horizontal base unit 5 at a point 6 so as to permit luffing movement of the boom 1. An hydraulic luffing ram 7 has one end of its cylinder 8 pivoted to the base unit 5 at a point 9 and its piston rod 10, which extends through the other end of the cylinder 8, pivoted to the boom section 2 at a point 11. The axis of the boom 1 makes an angle $\theta$ (the luff angle) with the horizontal, $\theta$ being variable by varying the extension of the luffing ram 7.

The base unit 5 is mounted upon a road vehicle chassis 12, and is arranged for rotation with respect to the chassis about a vertical axis on a slewing centre 13.

For modes of operation of the crane not involving a fly jib, a load is suspended by a hoist rope 14 which passes over a sheave (not shown) at the outer end of the boom section 4 to a winding drum (also not shown). It will be seen that by varying the extension of the boom and/or the luff angle the horizontal distance R1 between the slewing centre 13 and the hoist rope 14 can be varied so as to permit the lifting of loads located within a range of radii from the slewing centre.

For modes of operation of the crane involving a fly jib, a fly jib 15, shown in broken outline in FIG. 1, is secured to the outer end of the boom section 4, and the hoist rope 14' passes over a sheave (not shown) at its outer end. For any combination of boom extension and luff angle, the horizontal distance R2 between the slewing centre 13 and the hoist rope 14' is greater than the corresponding value of R1.

A load suspended by the hoist rope 14 (14') exerts a turning moment about the boom pivot point 6. To this is added the turning moment exerted by the weight of the boom acting through its centre of gravity 16. The total turning moment is opposed by the component normal to the boom axis of the reaction of the luffing ram 7.

Figure 2:
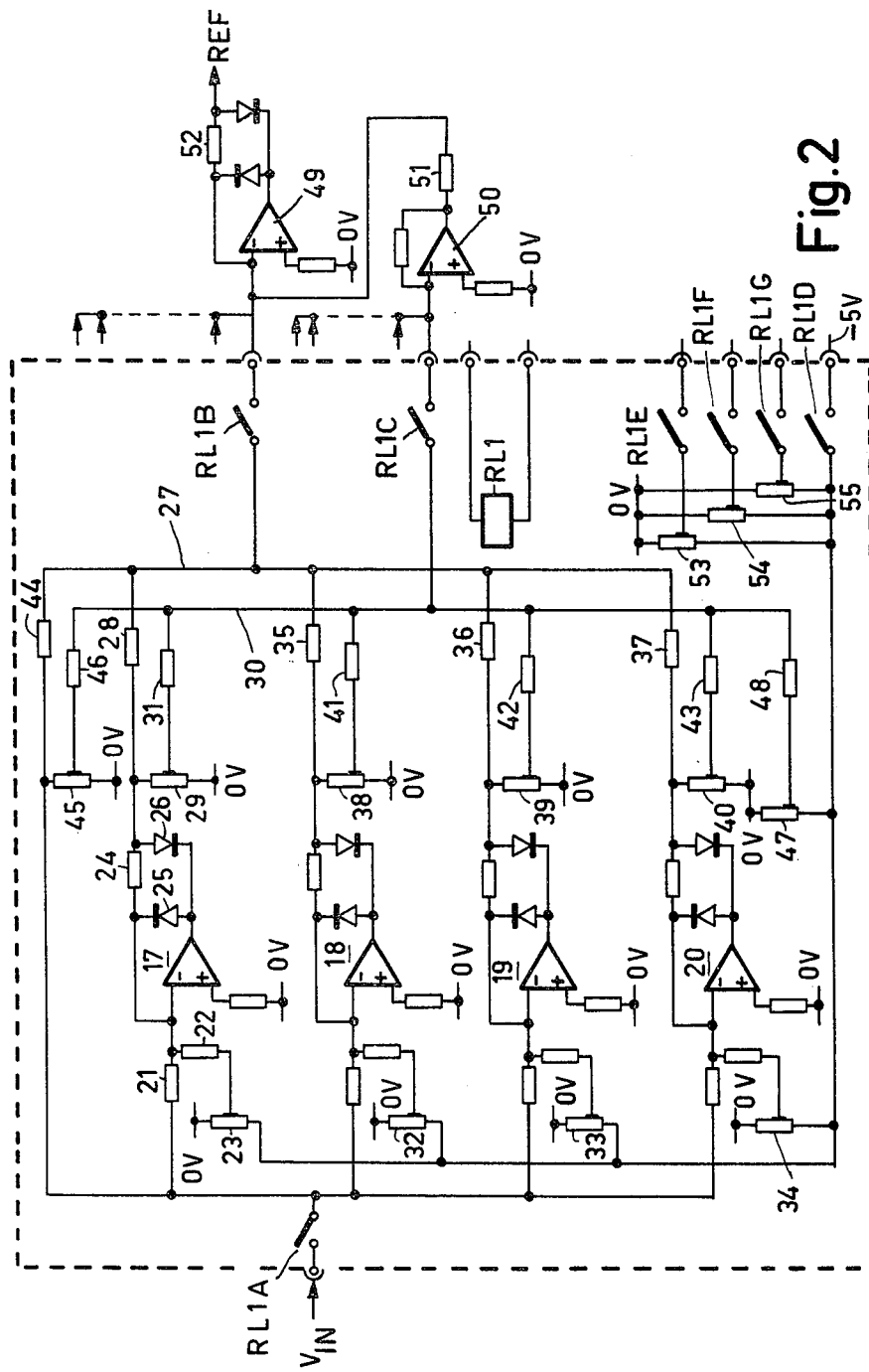
FIG. 2 is a schematic diagram of a known type of law generator unit.

A load indicating arrangement of the type specified for use with a mobile crane such as shown in FIG. 1 would include, as aforesaid, law generator means which hitherto has comprised a plurality of law generator units, one for each possible mode of operation of the crane. An example of such a law generator unit is shown in FIG. 2. This law generator unit is carried on a printed circuit board indicated by the broken line rectangle. The circuit of this unit comprises a plurality of similar threshold amplifiers indicated generally by the references 17, 18, 19 and 20. A positive going input $V_{IN}$, which may represent either the load radius or the luff angle, is applied to each threshold amplifier. Considering first the threshold amplifier 17, the input $V_{IN}$, which passes through a contact RLIA of a relay RL1 which is energised when the particular law generator unit is in use, is fed via an input resistor 21 to an input terminal of amplifier 17. A negative bias signal is fed to the same input terminal via a second input resistor 22 from the slider of a preset potentiometer 23 connected between a $-5V$ reference supply (via relay contact RLID) and ground (OV). The output terminal of amplifier 17 is connected to the same input terminal thereof via a feedback circuit comprising a resistor 24 and two diodes 25 and 26. The arrangement is such that if the magnitude of the positive input voltage $V_{IN}$ is less than the magnitude of the negative bias signal, giving a net negative input to the amplifier 17, the amplifier output tends to go positive. This causes the diode 25 to conduct. Since the input to the amplifier 17 is a virtual ground, the output is therefore clamped substantially at ground potential (plus the voltage developed across the low forward resistance of the diode 25) for all values of the voltage input $V_{IN}$ less than the value of the bias voltage set by the potentiometer 23.

If the value of the voltage input $V_{IN}$ is greater than the bias voltage value, thus giving a net positive input, the output of amplifier 17 goes negative. Diode 25 is cut off, but diode 26 conducts, connecting resistor 24 as a feedback resistor between the output and input terminals of the amplifier 17.

Therefore, as the voltage input $V_{IN}$ varies from zero to its maximum, say $+5V$, the output of the threshold amplifier 17 remains substantially zero until the input $V_{IN}$ reaches a value (the threshold or break value) determined by the setting of the potentiometer 23. Thereafter, the output increases linearly with a further increase of the voltage input $V_{IN}$, with a negative polarity and at a rate determined by the relative values of the feedback resistor 24 and the input resistor 21.

The output of the threshold amplifier 17 is applied to a first summing junction 27 via a resistor 28 and also to one end of a potentiometer 29. The slider of the potentiometer 29 is connected to a second summing junction 30 via a resistor 31.

The threshold amplifiers 18, 19 and 20 are similar to the amplifier 17 just described, being provided with respective threshold-setting potentiometers 32, 33 and 34. Their outputs are applied to the first summing junction 27 via respective resistors 35, 36 and 37 and also to respective potentiometers 38, 39 and 40. The sliders of the potentiometers 38, 39 and 40 are connected via respective resistors 41, 42 and 43 to the second summing junction 30.

The input $V_{IN}$ is applied to the first summing junction 27 via a resistor 44 and also to a potentiometer 45, whose slider is connected to the second summing junction 30 via a resistor 46.

A potentiometer 47 is connected between ground and the $-5V$ reference supply, and its slider is connected to the second summing junction 30 via a resistor 48.

The first summing junction 27 is connected via relay contact RLIB to a terminal input of an amplifier 49 contained in a mode unit forming the law generator means. The second summing junction 30 is connectd via relay contact RLIC to an input terminal of an inverting amplifier 50, whose output terminal is connected via a resistor 51 to the said input terminal of amplifier 49.

The operation is as follows: ignoring for the present the second summing junction 30 and the amplifier 50, the output of the amplifier 49 depends on the contributions to the first summing junction 27 from the input $V_{IN}$ via resistor 44 and from the threshold amplifiers 17, 18, 19 and 20.

As the input $V_{IN}$ increases from zero, current flows through resistor 44, but until the input $V_{IN}$ reaches the respective break points of the threshold amplifiers, their outputs all remain zero. Consequently, the output of the amplifier 49 initially increases linearly with the input $V_{IN}$ at a rate determined by the relative values of a feedback resistor 52 and the resistor 44, and with a negative polarity.

When the input $V_{IN}$ reaches the first break point, determined by the setting of the potentiometer 23, the first threshold amplifier 17 commences to give an output which increases linearly with a further increase of the input $V_{IN}$, and which is negative going. The current flowing via resistor 28 into the input terminal of the amplifier 49 is therefore of opposite polarity to the current flowing via resistor 44. The net effect is that the rate of rise of input current with an increase of the input $V_{IN}$ is reduced for values of the input $V_{IN}$ above the first break point. Therefore, the rate of increase of the output of the amplifier 49 is similarly reduced.

As the input $V_{IN}$ continues to increase it reaches successively the second, third and fourth break points determined respectively by the settings of the potentiometers 32, 33 and 34. At these points, the threshold amplifiers 18, 19 and 20 commence in turn to contribute to the input current to the amplifier 49.

The result is that a curve relating the output of the amplifier 49 to the input $V_{IN}$, neglecting the amplifier 50, comprises five linear sections whose slopes are progressively less. The break points at which the slope changes are selected by adjustment of the potentiometers 23, 32, 33 and 34.

Turning now to the summing junction 30 and the amplifier 50 it will be seen that the inputs to this junction comprise a fraction of the voltage input $V_{IN}$ chosen by adjustment of the potentiometer 45 and fractions of the outputs of the threshold amplifiers 17, 18, 19 and 20 selected respectively by adjustment of the potentiometers 29, 38, 39 and 40. Consequently, the curve relating the output of amplifier 50 to the input $V_{IN}$ comprises five linear sections whose slopes are progressively less, and which individually are less than or equal to the slopes of the sections of the corresponding curve for the amplifier 49. The break points of the two curves are identical.

Since the output of the amplifier 50 is applied to the input terminal of the amplifier 49, the overall output of the latter amplifier is the difference between the two curves aforesaid. Consequently, the overall characteristic is a curve comprising five linear sections, both the slopes of the identical sections and the break points at which the slopes change being adjustable. In addition, the DC level of the characteristic may be varied by adjustment of the potentiometer 47, which modifies the current into the summing junction 30.

The Break-potentiometers, the Slope-potentiometers and the Shift-potentiometer are adjusted to produce an overall characteristic which matches within close limits a crane rating curve. The resultant reference output REF is produced from the law generator unit for utilisation in the load indicating arrangement.

A law generator unit is provided for each separate rating curve. Each first summing junction 27 is connected via its respective relay contact RLIB to the input terminal of the amplifier 49 and each second summing junction 30 is connected via its respective relay contact RLIC to the input terminal of the amplifier 50. Selection circuits within the mode unit ensure that only one of the relays, such as relay RLI, is energised at any time so that only one of the law generator units is operational at a time.

In the law generator unit, further potentiometers 53, 54 and 55 are connected across the −5V reference supply. The sliders of the potentiometers are connected to one side of respective relay contacts RLIE, RLIF, and RLIG. In the mode unit, the other side of the contact RLIE is commoned with similar contacts RLIE in other law generator units, and similarly for contacts RLIF and RLIG.

In the arrangement just described with reference to FIG. 2, preset potentiometers are employed to store, in analogue form, data relating to the manufacturer's rating curve for a particular mode, and also data relating to parameters of the crane which are constant in that mode, but may have different values when the crane is operated in other modes. In the example shown, ten potentiometers carry rating data and three carry crane parameter data.

The number of crane parameters requiring storage may vary somewhat according to the design of the crane, but will not in general exceed six. In the extreme, a total of 16 potentiometers would therefore be required in each law generator unit.

In law generator means according to the present invention, the data which was previously stored in analogue form on potentiometers is now stored in digital form, for example, in a Programmable Read Only Memory (PROM). This digital data is accessed on a time division multiplex basis and converted into analogue form for utilisation in the load indicating arrangement. This storage of the data in analogue and digital form is illustrated in FIG. 3.

Consider first the storage technique shown in FIG. 3(a). A potentiometer 56 is preset to produce at its slider a potential $V_S=kV_R$ where $V_R$ is the potential applied across the potentiometer and k is a constant whose value depends on the position of the slider. The potentiometer 56 may therefore be regarded as storing the constant k in analogue form.

Turning to the storage technique shown in FIG. 3(b), a digital equivalent of the constant k is stored in a memory device 57. The stored digits are read into the multi-lead digital input of a digital-to-analogue converter 58. The converter 58 is of the multiplying type in which the output is the product of a digital input and an analogue reference. A reference potential $V_R$ is applied to a reference input of the converter 58 which therefore produces an output $V_S=kV_R$. Thus the storage technique of FIG. 3(b) is equivalent to the storage technique of FIG. 3(a).

Turning to FIG. 4, a digital-to-analogue converter 59 has its digital input connected successively to each of n locations of a memory device 60 via a multiplexing circuit represented by a switch 61. Constants $k_1, k_2 \ldots k_n$ are stored in digital form in the respective n locations of the memory device 60. For convenience, the digital input of the converter 59 has been shown as a single lead for connection successively to single output leads of the memory device 60. However, in practice, this digital input and the memory device outputs would be multi-lead connections as in FIG. 3(b).

Reference potentials $V_{R1}, V_{R2} \ldots V_{RN}$ are connected successively to the reference input of the converter 59 by a multiplexing circuit represented by a switch 62. The output of the converter 59 is connected successively to the inputs of sample and hold circuits $63_1, 63_2 \ldots 63_n$ by a multiplexing circuit represented by a switch 64.

If the switches 61, 62 and 64 are operable synchronously in a stepping cycle, it will be apparent that the sample and hold circuits $63_1, 63_2 \ldots 63_n$ will assume respective potentials $V_{S1}=k_1V_{R1}$, $V_{S2}=k_2V_{R2}$, etc. Thus, this storage mode is equivalent to n potentiometers employed as analogue stores for the constants $k_1, k_2 \ldots k_n$.

Figure 5:
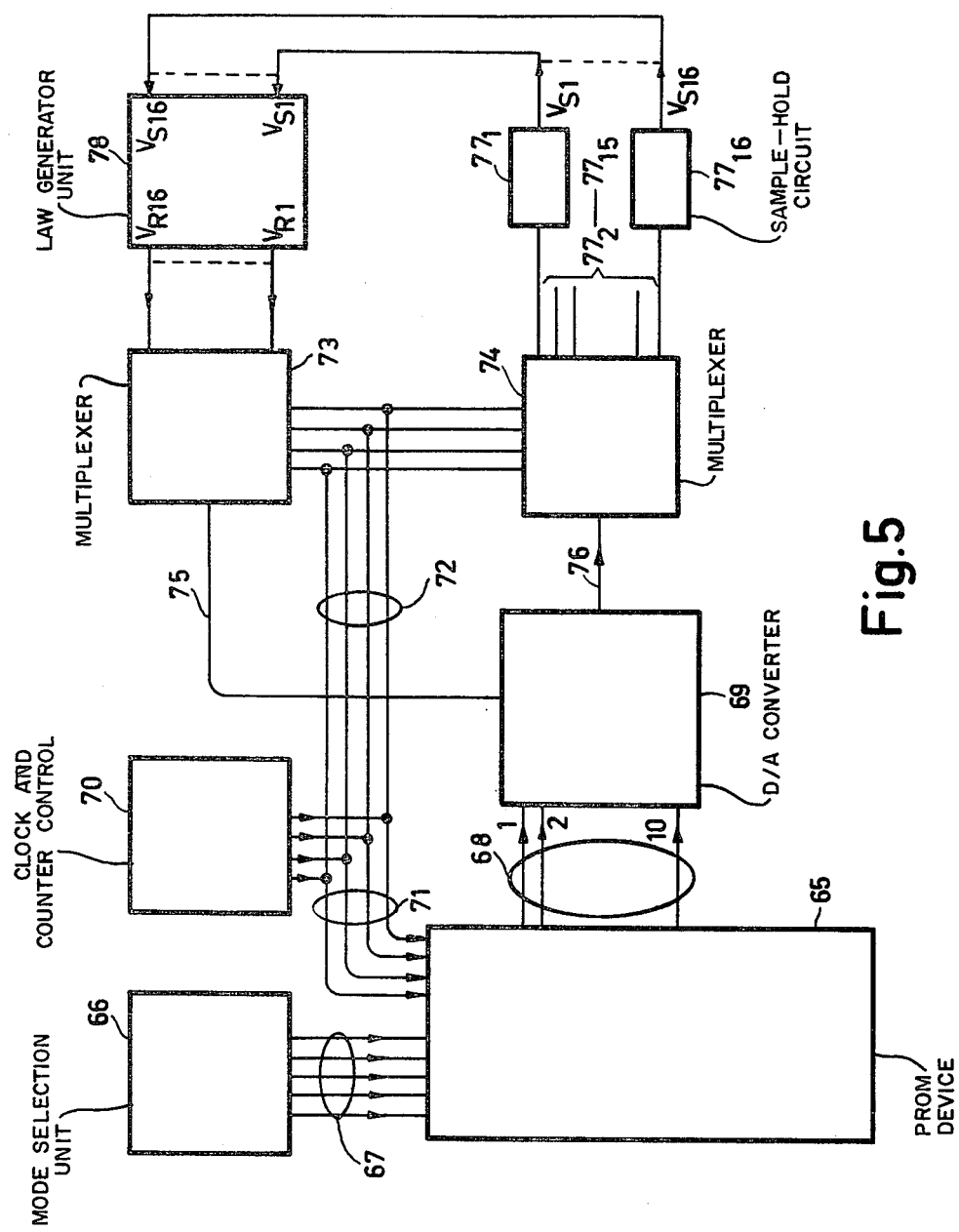
FIG. 5 is a schematic diagram of law generator means according to the invention suitable for use in a load indicating arrangement.

Law generator means using this storage mode and suitable for use with cranes having up to thirty-two different modes of operation is shown in FIG. 5. In the law generator means shown in FIG. 5, a programmable read only memory device 65 has thirty-two main locations each of which contains sixteen sub-locations. A respective main location is allocated to each mode of operation of the crane, and is selectable by a binary five-bit address code which is provided by a mode selection unit 66. The unit 66 may be manually operable, or may be responsive to sensors which detect the conditions of the various parts of the crane, and thereby inidcate the mode of operation actually being used. The unit 65 can thus comprise a series of switches which are manually or remotely operable and which selectively connect patterns of potentials corresponding to the appropriate address codes to a five-lead connection 67 which feeds the address codes to the memory device 65.

In the sixteen sub-locations of each main location of the memory device 65 are stored respective constants $k_1, k_2 \ldots k_{16}$, which pertain to the particular crane mode of operation to which the main location is allocated. Each such constant is stored in digital form as a binary word, typically of ten bits. Each sub-location can be selected by a binary four-bit address code. When a sub-location is selected by addressing the memory device 65 with the appropriate four-bit address code, and the main location which contains this sub-location is also selected by addressing the memory device 65 with the appropriate five-bit address code as well, the word stored in the sub-location is read out over a ten-lead connection 68 to a digital-to-analogue converter 69. To achieve this read out of the stored binary words representing the respective constants, a clock and counter unit 70 provides a recurrent cycle of sixteen different four-bit address codes which are applied successively over a four-lead connection 71 to the memory device 65. Each such four-bit address code identifies respective corresponding sub-locations in all the thirty-two main locations. However, of the thirty-two possible sub-locations thus identified by each sub-location address code, only the particular one in the particular main location which is selected by mode selection unit 66 is actually selected. Therefore, a cycle of the sixteen different four-bit address codes from the unit 70 will result in the sixteen sub-locations of a selected main location being addressed in turn to supply their stored binary words in turn over the ten-lead connection 68 to the converter 69. This selective addressing of the 32 × 16 = 512 sub-locations can be effected using well-established co-ordinate matrix gating techniques.

The recurrent cycle of sixteen four-bit address codes provided by the unit 70 is also applied over a four-lead connection 72 to two multiplexer units 73 and 74. The multiplexer unit 73 is operable to connect, sequentially, each of sixteen reference potentials $V_{R1}$, $V_{R2}$ ... $V_{R16}$ to the reference input of the converter 69 over a connection 75. The multiplexer 74 is operable to connect, sequentially, the output from the converter 69, which it receives over a connection 76, to the input of each of sixteen sample and hold circuits $77_1$, $77_2$, ... $77_{16}$. These sample and hold circuits provide respective output potentials $V_{S1}$ $V_{S2}$ ... $V_{S16}$. A single law generator unit 78 supplies the potentials $V_{R1}$, $V_{R2}$ ... $V_{R16}$, and receives the output potentials $V_{S1}$, $V_{S2}$ ... $V_{S16}$.

The law generator means shown in FIG. 5 can be realised using commercially available devices. For instance, the memory device 65 can be comprised by a suitable number of 2k/bit PROMS type INTEL 8702, the converter 69 can be of the type AD7520 supplied by Analog Devices Limited, and the two multiplexers 73 and 74 can be of the type CD4067 supplied by RCA. The unit 70 can be a conventional binary counter which is driven by a free-running oscillator. The clock rate can be 5–6 KHz which has been found to be adequate to update the output potentials $V_{S1}$, $V_{S2}$, ... $V_{S16}$ of the sample and hold circuits. The latter can comprise respective operational amplifiers having a feedback resistor to provide unity amplification and an input sampling capacitor, as shown in FIG. 4. The form which the unit 66 can have has already been mentioned.

Figure 6:
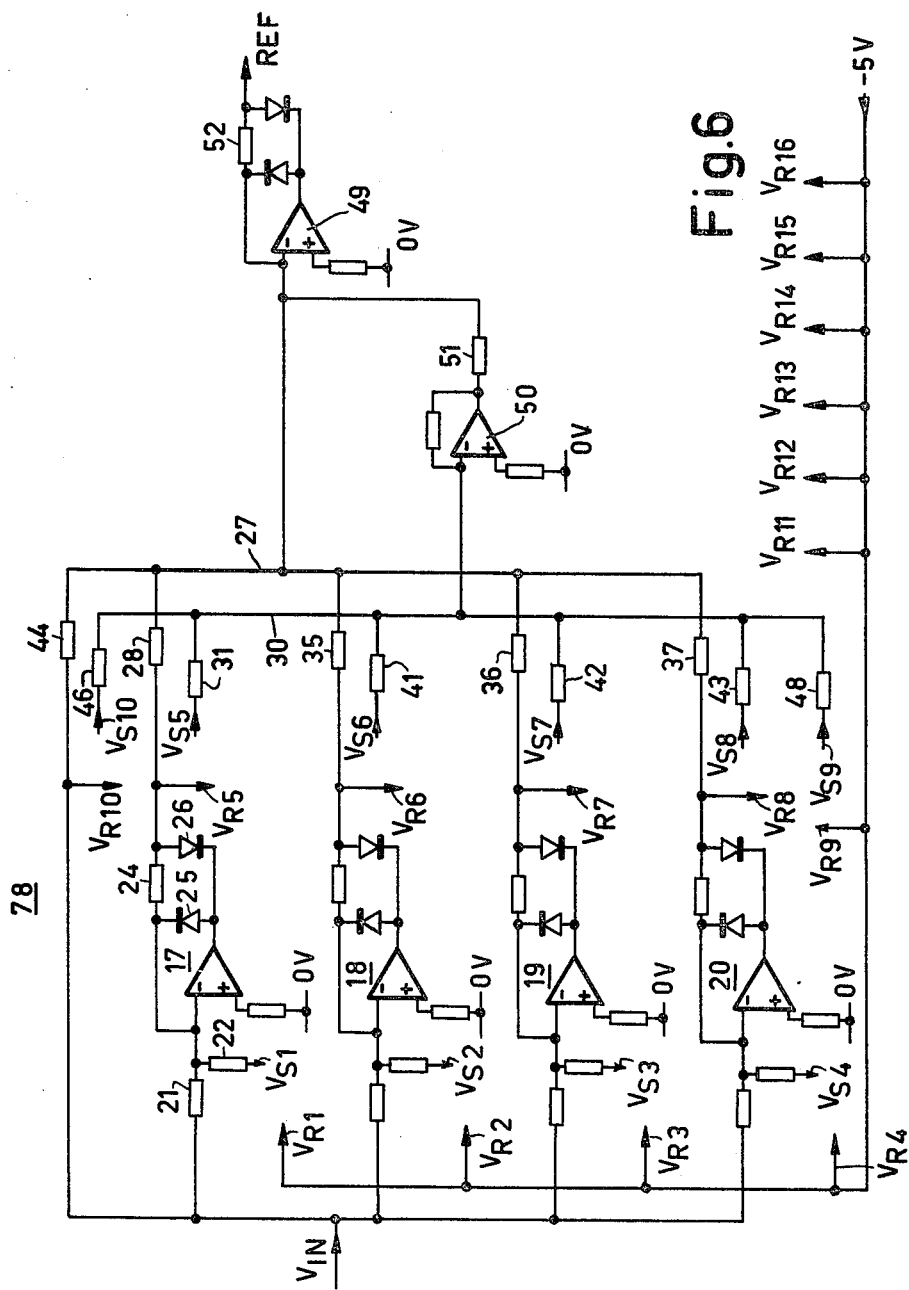
FIG. 6 is a circuit diagram of a law generator unit for use in the law generator means of FIG. 5.

FIG. 6 shows in detail the single law generator unit 78 of FIG. 5 for use in the invention. For the sake of comparison, the elements of the unit of FIG. 6 have been given the same reference numerals as corresponding elements of the law generator unit of FIG. 2. Comparison of these two units will show that the various potentiometers in the unit of FIG. 2 which define the different "break points" and "slopes" of the law curve provided by this unit have been replaced in the unit of FIG. 6 by equivalent potentials $V_R$ and $V_S$ as produced by the law generator means of FIG. 5. Since these potentials can be changed by addressing different main locations of the memory device 65 in the law generator means, only one law generator unit is now required for all operation modes of a crane. Consequently, the relay RL1 shown in FIG. 2 is also unnecessary.

Figure 7:
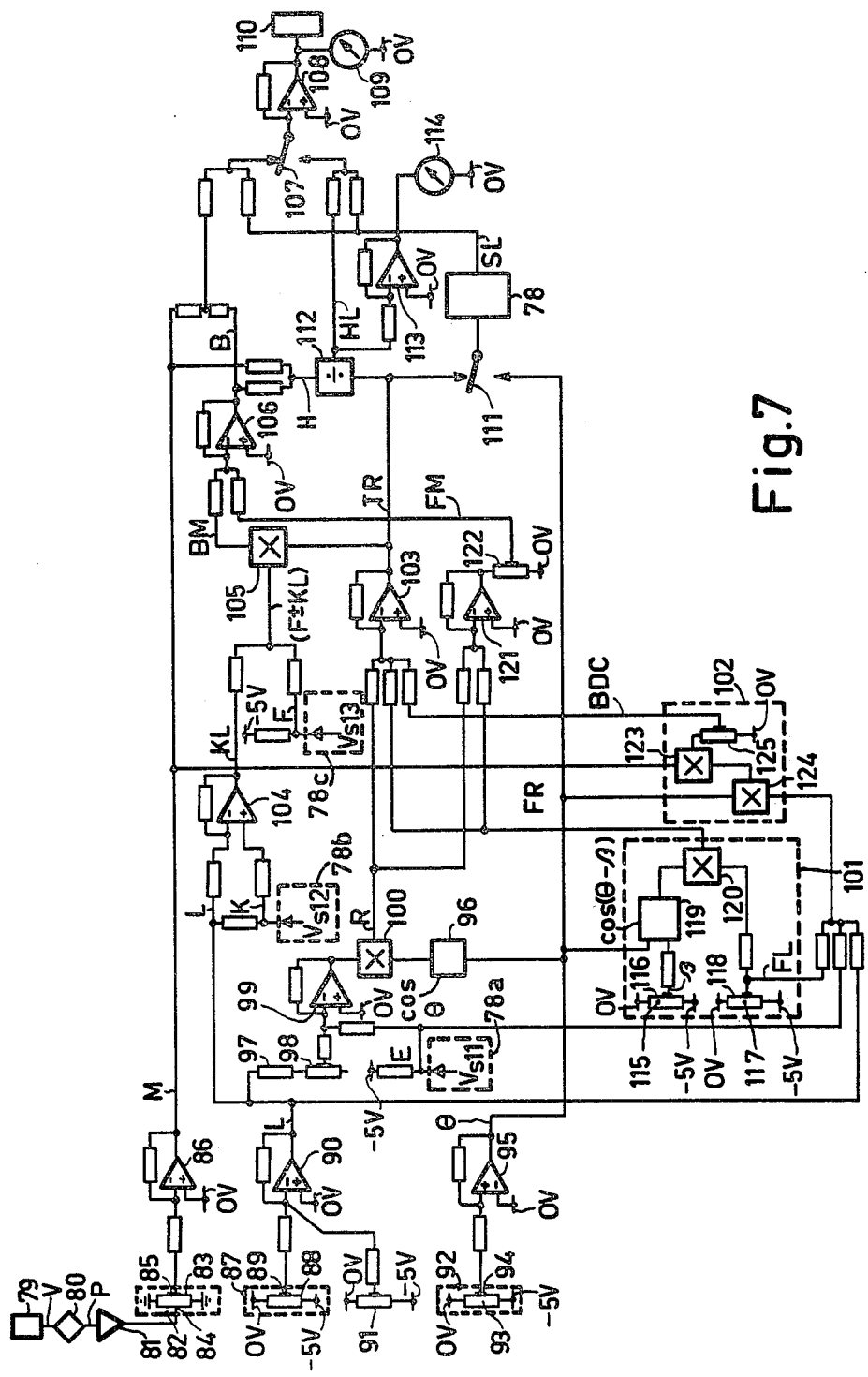
FIG. 7 is a block schematic diagram of one form of crane load indicating arrangement of the type specified including law generator means.

A crane load indicating arrangement of the type described in U.S. Pat. No. 3,965,733, which may include law generating means according to the invention, is shown in FIG. 7. In this arrangement the law generator means is represented by the full line rectangle 78 and the dotted line rectangles 78a, 78b and 78c. It is assumed that potentials $V_{S1}$ to $V_{S10}$ are utilised in the full line rectangle 78 for producing the appropriate rating curves, and that potentials $V_{S11}$, $V_{S12}$ and $V_{S13}$ are utilised in the dotted line rectangles, 78a, 78b and 78c, respectively, for producing crane parameter data. The arrangement of FIG. 7 operates as follows. A reference signal generator 79, for example a 700 Hz square wave oscillator, provides a stable signal V of constant voltage. This signal V is supplied to a transducer 80 which is connected to a crane luffing ram (e.g. ram 7 in FIG. 1) and is adapted to produce an output P which is a function of the reaction sustained by this ram in supporting the crane boom (e.g. boom 1 in FIG. 1) and any load suspended from it.

The signal P is applied via a buffer amplifier 81 to an input terminal of a ram angle sensor 82, comprising a potentiometer having a resistive track 83. The ends of the track 83 are connected to ground and the signal P is applied at a tapping point 84 intermediate the ends of the track 83. The potentiometer body is mounted in fixed relation to the boom 1, and a slider 85, which contacts the track 83, is mechanically coupled to the luffing ram 7 so that it moves over the track 83 when the angle $\phi$ included between the boom 1 and the ram 7 changes with changing extension of the ram. The track 83 is graded so that the signal appearing at the slider 85 is proportional to sin $\phi$. The slider 85 is connected to an input terminal of an amplifier 86 which provides an amplified output M proportional to P sin $\phi$, i.e. to the component of the ram reaction normal to the boom 1. Output M is therefore also proportional to the total turning moment of the boom about the boom pivot point 6, that is, the turning moment due to both the load and the weight of the boom.

A boom extension sensor 87 comprises a potentiometer having a resistive track 88 and a slider 89 which is mechanically coupled to the boom so as to be driven over the track 88 as the boom extension is varied from minimum to maximum. The end of the track 88 corresponding to maximum extension is connected to the negative terminal of a stablised reference supply (e.g. −5V), the other end being connected to the 0v side of the supply. It is assumed for the purposes of the present description that the load indicating arrangement is energised by a −5V stabilised reference supply, but it is to be understood that this voltage is given only as an example and that the actual voltage supply required depends upon the type of circuit elements used in the load indicating arrangement. The slider 89 is connected to an input terminal of a buffer amplifier 90. There is also connected to this input terminal of amplifier 90 a preset potentiometer 91 connected across the −5v reference supply. This potentiometer 91 is provided to facilitate initial setting-up of the arrangement. The amplifier 90 gives an output L proportional to the boom extension.

A boom luff angle sensor 92 comprises a potentiometer mounted for movement with the boom 1 and having a resistive track 93 connected across the −5v reference supply. A slider 94 is gravity actuated, e.g. by a pendulum, so that it moves over the track 93 as the luff angle changes when the extension of the luffing ram 7 is varied. The slider 94 is connected to an input terminal of a buffer amplifier 95 which gives an output $\theta$ proportional to the luff angle $\theta$. This output is applied to a cosine law generator unit 96. This unit 96 is preferably of a type in which the slope of its input/output characteristic is modified stepwise in accordance with changes in its input amplitude so as to produce an overall characteristic comprising a plurality of linear sections of differing slopes and approximating closely to a cosine law. The resultant output from unit 96 is thus proportional to the cosine of the luff angle $\theta$.

The boom extension output L produced by the amplifier 90 is fed via a gain control element comprising a fixed resistor 97 and a preset variable resistor 98 to an input terminal of a summing amplifier 99. Also fed to this input terminal is an output E which is proportional to the length of the boom when fully retracted.

The fully-retracted length of the boom is constant for any one mode of operation of the crane, but may vary from mode to mode, e.g. if a fly jib is fitted. Thus, the output E is provided from the part 78a of the law generator means, being derived from the output $V_{S11}$ which has a value appropriate to a particular mode of operation of the crane.

The resultant output of the amplifier 99 is thus proportional to the total length of the boom and is applied as a first input to an analogue multiplying unit 100. The output of the cosine law generator unit 96 is applied as a second input to the unit 100. Thus, the multiplier unit 100 produces a resultant output R proportional to $(L + E) \cos \theta$. It can be seen from FIG. 1 that $(L + E) \cos \theta$ is the basic horizontal distance between the boom pivot point 6 and the load, and that it equals the sum of the radius R1 of the load from the slewing centre 13 and the distance D between the slewing centre and the boom pivot point. Basic horizontal distance means that no account has been taken in the derivation of the output R of any increase in radius when the fly jib is fitted or to the radius increase due to boom deflection. Thus, output R α basic radius. This output R becomes a true radius output TR when these two factors have been taken into account, as will be described.

A circuit element 101 produces an output FR representing the radius increase due to a fly jib, when fitted, and a circuit element 102 produces an output BDC representing the radius increase due to boom deflection. Detailed descriptions of these circuit elements 101 and 102 are given hereinafter. The outputs R, FR and BDC are summed by an amplifier 103 to produce an output TR proportional to the true radius of the load from the boom pivot point 6.

The turning moment of the boom alone (i.e. neglecting the moment of the load) about its pivot point 6 is determined by the (constant) weight of the boom acting through its centre of gravity 16, and by the position of the centre of gravity. The latter will change as the boom extension is varied, and the change will be affected by the telescopic structure of the boom. It is apparent that a weight can be computed which varies as a function of boom extension and which when assumed to act at the outer end of the boom can produce the same turning moment as that produced by the weight of the boom structure acting through its centre of gravity; that is, a weight which is representative of the weight of the boom structure acting through its centre of gravity. It can be shown that an expression for such a weight has the form $(F \pm KL)$, where F is a constant related to the weight of the boom structure, and KL is related to the position of the centre of gravity of the boom structure, for a given mode of operation, K being a constant for a particular boom and L being the boom extension.

Since the value of K may vary from mode to mode of operation of the crane, the part 78b of the law generator means is used, the output K being derived from the output $V_{S12}$ which has a value appropriate to a particular mode of operation of the crane. The outputs L and K are applied to respective input terminals of an amplifier 104 which produces an output KL.

An output proportional to the constant F is produced by the part 78c of the law generator means, being derived from the output $V_{S13}$ which, like the other outputs $V_{S11}$ and $V_{S12}$, has a vlaue appropriate to a particular mode of operation of the crane. The outputs KL and F are fed via respective summing resistors as one input to an analogue multiplying unit 105. The output BM TR is fed as a second input to the unit 105, whose output is therefore equal to $(F \pm KL)(TR)$, that is, the output BM is thus proportional to the turning moment of the boom. Without the outputs FR and BDC being taken into account, the output R could be used directly to produce the output BM.

This output BM from unit 105 is applied to an input terminal of a summing amplifier 106. To this input terminal are also applied, as will be described, a further output FM, which represents the moment due to a fly jib when fitted. The resultant output B from the summing amplifier 106 may thus be termed true boom moment, since it is proportional to the turning moment due to the boom, as corrected having regard to the fly jib (when present) and any boom deflection. The output B is of opposite polarity to the output M, which as previously stated, is proportional to the total turning moment of the boom about the boom pivot point 6. These two outputs are summed to produce a resultant output $H = (M-B)$ proportional to the turning moment due to the load alone, this output H being applied via relay changeover contact 107 to an input terminal of a summing amplifier 108.

A further output SL (see FIG. 7) is produced by the law generator means 78 and is also applied to the input terminal of the amplifier 108. This output SL is proportional to the maximum safe load moment which the crane is permitted to withstand for the boom length and luff angle that currently obtain in any particular mode of operation for which safe load is related to radius. The means 78 produces the output SL in response to the true radius output TR. The ouput SL is arranged to have a polarity opposite to that of the output H so that the net input to the amplifier 108 is equal to (SL-H). When, therefore, the crane has reached its maximum safe load moment in a particular mode of operation, SL = H and the net input is zero. The output of amplifier 108 is consequently also zero and is indicated at the calibration point of a safe working load meter 109 connected to the output terminal of the amplifier 108, the meter zero having been offset mechanically to this calibration point. Increase of load moment above the rated maximum (H > SL) will produce a net input of one polarity and a corresponding output from the amplifier 108 which will drive the meter 109 into an overload region of its scale. Load moments less than the rated maximum (SL > H) will produce a net input and corresponding output from the amplifier 108 of the opposite polarity, driving the meter 109 into a safe region of its scale and so indicating available lifting capacity.

The output of the amplifier 108 may also be applied to an alarm unit 110 which is adapted to produce an audible and/or visual alarm signal when the maximum safe load moment is reached or exceeded. The alarm unit 110 may also include means to provide a preliminary warning signal when the load moment exceeds a predetermined percentage of the maximum safe load moment, and/or trip circuits to cut off power to the hoist motor in the event of an overload.

For modes of operation of the crane not involving the fly jib, or for fly jib operation at very large radii, the load moment is sufficiently greater than the true boom moment for the comparison of load moment with maximum safe load moment to give a good dynamic range of operation of the arrangement, that is, an accurate indication of available lifting capacity for a wide range of load. However, for fly jib operation at lesser radii for which the maximum safe load is determined by the strength of the fly jib, the true boom moment can constitute a very high percentage of the total turning moment, so that only a poor dynamic range of operation would be possible because the range of values available for signifying the load moment output would be small. Therefore, for such modes of operation, the changeover contact 107 is operated to connect to the input terminal of amplifier 108 the output SL from the law generator means 78 and the output from an analogue divider unit 112. This unit 112 has as inputs the true radius output TR referred to earlier and another output H = (M−B) proportional to the turning moment due to the load alone. The unit 112 is responsive to these two inputs to produce an output HL proportional to the weight of the load. The output SL is combined algebraically with the output HL so that the net input to the amplifier 108 is now equal to (SL ± HL). In other words, the indication provided by the meter 109 of available lifting capacity, and the operation of the alarm unit 110, are now in respect of actual hook load as compared with load moment which was the case for modes of operation for which safe load is related to radius. The output HL is also applied to an input terminal of an amplifier 113 the output of which drives a meter 114 which is calibrated to indicate actual hook load. This meter 114 provides such an indication for all modes of operation of the crane. For angle related duties, a changeover contact 111 is operated to apply the outlet $\theta$ to the law generator means 78.

Considering now the circuit element 101 which provides corrective outputs when a fly jib is fitted, and the circuit element 102 which provides corrective outputs in respect of boom deflection. It is these corrective outputs which contribute to the production of the true radius output TR and the output B proportional to true boom moment. More specifically, the circuit element 101 comprises a first potentiometer 115 having a resistive track 116 connected across the −5v reference supply. This potentiometer 115 is preset so as to provide an output proportional to the fly offset angle $\beta$. A second potentiometer 117 having a resistive track 118 connected across the −5v reference supply is preset so as to provide an output FL proportional to the length of the fly jib. The output from the potentiometer 115 is applied together with the output $\theta$ from amplifier 95, which is proportional to the luff angle $\theta$, to a cosine law generator unit 119 that can be of a type similar to the cosine law generator unit 96 but is arranged to give an output proportional to cos $(\theta - \beta)$. This output from the unit 119 is applied as one input to an analogue multiplying unit 120. The output FL from the potentiometer 117 is applied as a second input to the unit 120 which is responsive to these two inputs to produce the output FR which is proportional to the "fly radius", that is the distance R2-R1 in FIG. 1. This output FR is applied to an input terminal of the summing amplifier 103 as previously described, and also to an input terminal of a further summing amplifier 121. The output R from unit 100, which is proportional to the basic radius, is applied to the same input terminal of amplifier 121, which latter sums these to inputs to produce an output proportional to the total distance R+ (R2-R1). A potentiometer 122 is connected between the OV line and the output terminal of the amplifier 121, this potentiometer being preset in accordance with the weight of the fly jib acting through its centre of gravity. Thus, the output FM at the slider of potentiometer 122 is proportional to the turning moment of the fly jib. This output FM is summed with the output from unit 105 in the amplifier 106.

The circuit element 102 comprises two analogue multiplying units 123 and 124. The outputs L, E and FL are summed to form one input to the unit 124 and the output $\theta$ is applied to the unit 124 as a second input. The resultant output (L + E + FL) $\theta$ from the unit 124 is thus proportional to the product of the total length (including fly jib when fitted) of the boom and the luff angle $\theta$. This resultant output is applied as one input to the unit 123 and the output M, proportional to the total turning moment of the boom, is applied as a second input to this unit 123. A potentiometer 125 is connected between the OV line and the output terminal of the unit 123, this potentiometer being preset on initial setting-up of the arrangement to provide a resistance value appropriate to the particular boom structure concerned. The output from the unit 123 is the product of the output M and the output (L + E + FL) $\theta$ and is adjusted in magnitude by the setting of potentiometer 125 to form the output BDC which is a function of the boom deflection that occurs for the boom length, luff angle, and total turning moment currently obtaining. Boom deflection results in an increase in the radius that the load is at so that the output BDC is summed with the outputs R and FR at amplifier 103, which latter produces the true radius output TR.

It can be seen from the foregoing that the law generator means according to the invention provide a flexible and relatively cheap way of providing rating curves and crane parameter data for each mode of operation of a crane. With large cranes now providing greater numbers of different modes of operation, (e.g. 7500), the hitherto use of individual law generator unit boards for each mode of operation becomes progressively more impracticable.

What we claim is:

1. A load indicating arrangement for use with a crane or other lifting apparatus of the type having plural modes of operation comprising, law generator means including means to produce for each mode of operation of the lifting apparatus a reference output signal which is representative of the maximum safe load for the lifting apparatus in its prevailing operation mode, means for producing a working output signal which is representative of the actual load on the lifting apparatus in the prevailing operation mode, and means responsive to said reference and working signal outputs to provide an indication of available lifting capacity of the lifting apparatus, said law generator means comprising a digital storage device having a storage location individual to each mode of operation of the lifting apparatus, each storage location being adapted to store a plurality of items of information pertaining to the operating characteristics of the lifting apparatus for a particular mode of operation, selection means for selecting a storage location corresponding to a desired mode of operation, read-out means for reading out and temporarily storing the plurality of items of information from the selected storage location, and means responsive to the temporarily stored items of information for determining the value of said reference output signal.

2. A load indicating arrangement as claimed in claim 1, wherein the reference output signal determining means comprises a single law generator unit which is common to all modes of operation of the lifting apparatus, but which provides a different input/output characteristic for each mode of operation in accordance with the values of the temporarily stored items of information.

3. A load indicating arrangement as claimed in claim 2, wherein said items of information represent constants which are stored in the storage device in digital form, and the read-out means includes a digital-to-analogue converter coupled to the storage device to convert said items of information into analogue potentials upon read out from the storage device, the analogue potentials being used to bias the law generator unit appropriately for the production of the required input/output characteristic.

4. A load indicating arrangement as claimed in claim 3, wherein other items of information are stored in the storage device which represent parameter data unique to a particular lifting apparatus, said parameter data being read out from the storage device and converted into analogue potentials to provide said unique parameter data for use in the load indicating arrangement for a particular mode of operation concerned.

5. A load indicating arrangement as claimed in claim 3, wherein each storage location of the storage device comprises a plurality of sub-locations for storing respective items of information in digital form, said law generator means further comprising, a clock and counter unit for addressing corresponding sub-locations in all the storage locations in turn in a recurrent addressing cycle to read out in sequence the respective items of information from the successive sub-locations of a selected storage location, and multiplexing means operated by said clock and counter unit in synchronism with said addressing cycle to apply the output of said digital-to-analogue converter sequentially to a plurality of sample and hold circuits, the sample and hold circuits providing the temporary storage of said analogue potentials.

6. A load indicating arrangement as claimed in claim 5, wherein further multiplexing means are provided to apply each of a plurality of reference voltages to said digital-to-analogue converter in sequence, said converter being responsive to provide an analogue output signal for each received item of information of a value which is a function of the prevailing reference voltage applied to it, said further multiplexing means also being operated by said clock and counter unit in synchronism with said addressing cycle.

* * * * *